Aug. 16, 1966  W. H. HAMILTON  3,266,677
METERING HOPPER
Filed Aug. 27, 1964  2 Sheets-Sheet 2
FIG.2
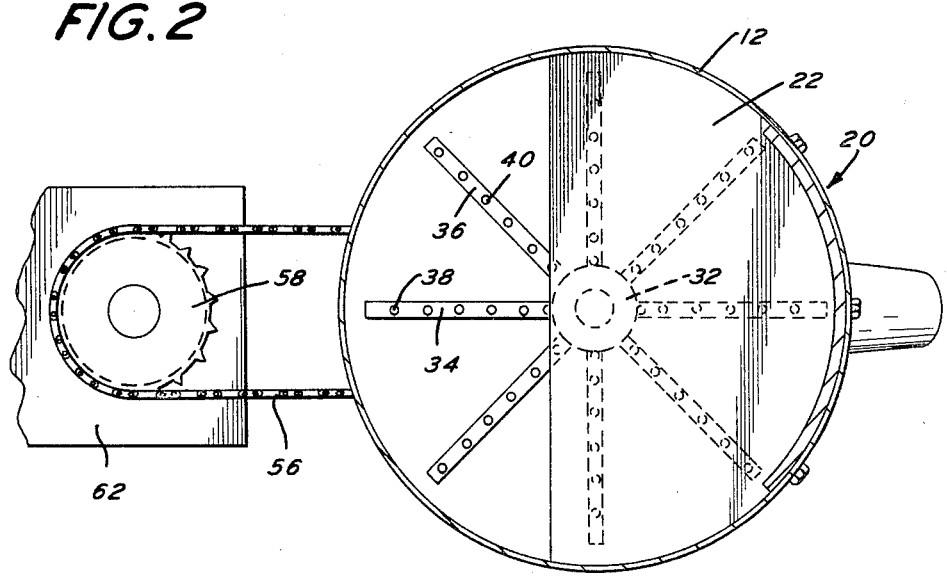
FIG.3
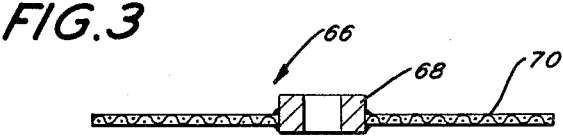
FIG.4
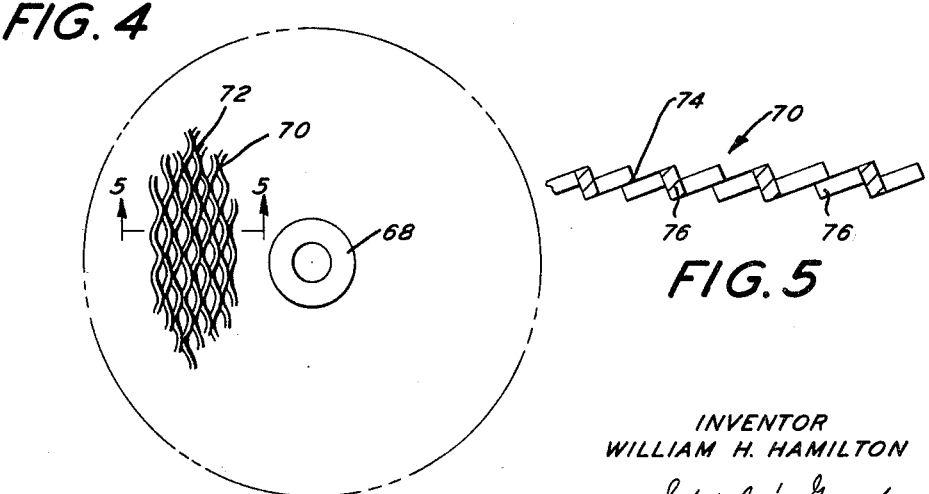
FIG.5
INVENTOR
WILLIAM H. HAMILTON
BY Seidel & Gonda
ATTORNEYS.

United States Patent Office 3,266,677
Patented August 16, 1966

3,266,677
METERING HOPPER
William H. Hamilton, Philadelphia, Pa., assignor to Pennsalt Chemical Corporation, Philadelphia, Pa., a corporation of Pennsylvania
Filed Aug. 27, 1964, Ser. No. 392,411
6 Claims. (Cl. 222—370)

This invention relates to a hopper adapted to feed a metered amount of granular material into a press.

The hopper of the present invention has specific utility for feeding a metered amount of granular material to a die of a tablet press. In the manufacture of tablets, for example, medicinal tablets, a controlled amount of material must be compressed into the final product.

Powdered material generally used in the formation of medicinal tablets is not free flowing and tends to accumulate and lump. Therefore, the hopper of the present invention is so designed so that it not only feeds a precise quantity of granular material to the tablet press, but also insures uniform and free flow of the material.

It is often desirable to increase or decrease the amount of material being compressed to form a tablet. This occurs frequently since the dosage contained in any one given medicinal tablet may be varied. On the other hand, it may be desirable to increase the speed at which the tablets are formed. The hopper of the present invention is thus designed to deliver different metered amounts of granular material to a tablet forming press per unit of time or given metered amount at a variable rate. This is readily accomplished without the necessity for removing and replacing any of the components of the hopper.

The hopper of the present invention is adapted to be used with any conventional tablet forming press and is a self-contained unit. The hopper may be interchanged with various presses and may be used with any single conventional press without modifying any of the structure thereof.

Accordingly, it is an object of the present invention to provide a novel hopper for feeding a metered amount of granular material.

Another object of this invention is to provide a hopper in which any given amount of metered material may be delivered at a variable rate.

A still further object of this invention is to provide a hopper for feeding different metered amounts of granular material per unit of time.

A still further object of the present invention is to provide a hopper for feeding a metered amount of granular material which includes means for insuring the free flow of the material.

A still further object of this invention is to provide a hopper for feeding a metered amount of granular material into a tablet forming press or the like.

Another object of the present invention is to provide a hopper for feeding a metered amount of granular material into any conventional tablet forming press.

A further object of the present invention is to provide a hopper for feeding a metered amount of granular material into a tablet forming press and which is a self-contained unit which may be interchanged with any number of conventional presses without any structural modification of either the hopper or the press.

Other objects will appear from the disclosure which follows hereinafter.

For the purpose of illustrating the invention, there are shown in the drawings forms which are presently preferred; it being understood, however, that this invention is not limited to the precise arrangements and instrumentalities shown.

FIGURE 2 is a cross-sectional view taken substantially along the plane indicated by the line 2—2 of FIGURE 1.

FIGURE 3 is a cross-sectional view of another embodiment of a metering device which could be used with the hopper shown in FIGURE 1.

FIGURE 4 is a top plan view of the metering device shown in FIGURE 3.

FIGURE 5 is a cross-sectional view taken substantially along the plane indicated by the line 5—5 of FIGURE 4.

Figure 1:
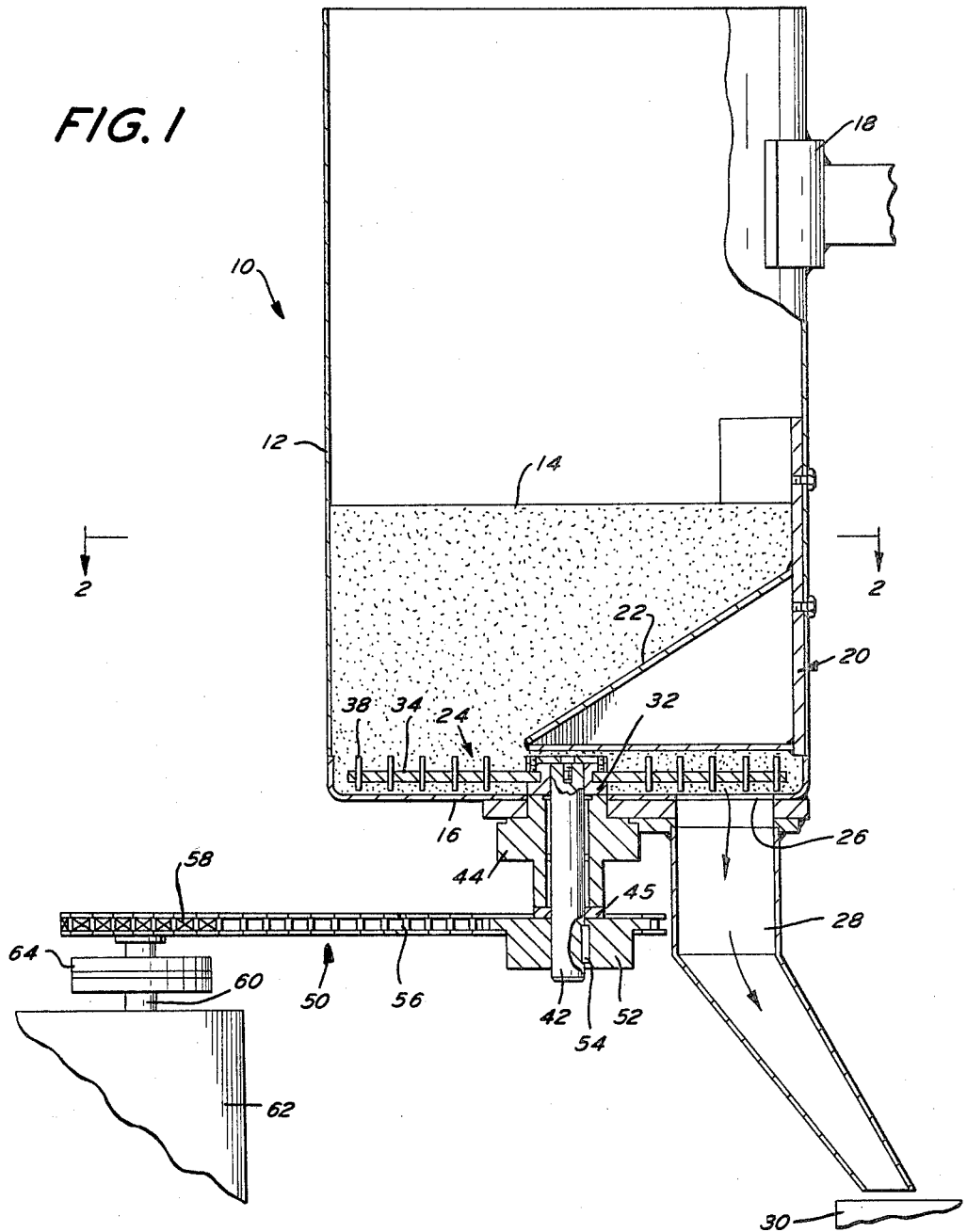
FIGURE 1 is a cross-sectional view taken through the longitudinal center of the metering hopper of the present invention.

Referring now to the drawings in detail, and particularly FIGURES 1 and 2, the metering hopper comprising the subject matter of the present invention is generally designated by the numeral 10.

The hopper 10 includes a substantially cylindrical housing 12 adapted to receive a quantity of granular material 14. The hopper 10 is adapted to deliver a predetermined amount of the material 14 per unit time to the die of a press such as indicated at 30. The press 30 may comprise a conventional tablet press such as disclosed in Patent 2,839,015, or in certain applications may comprise an extrusion press.

The housing 12 includes a bottom wall 16 against which the granular material 14 is adapted to seat. The bottom wall 16 includes a discharge opening 26. A metering device generally designated by the numeral 24 is adapted to deliver a predetermined amount of the granular material 14 per unit time to the discharge opening 26. Connected to the bottom wall 16 in surrounding relation to the discharge opening 26 is a chute 28. The chute 28 will convey the delivered granular material to a die in the press 30.

Connected to the side wall of the housing 12 is a baffle generally designated by the numeral 20. The baffle is mounted within the housing 12 above the metering device 24 and blocks direct communication between the chute 28 and granular material 14 initially deposited within the hopper 10. This insures that the metering device 24 is operative to deliver a metered amount of granular material to the chute 28.

The baffle 20 further includes an inclined wall 22. The inclined wall 22 delivers granular material 14 to the metering device 24 adjacent a portion of the bottom wall 16 opposite from the discharge opening 26.

The metering device 24 includes a hub 32 rotatably supported within the housing 12 adjacent a central portion of the bottom wall 16. Radiating from the hub 32 are a plurality of spokes such as 34 and 36. The spokes 34 and 36 include upright pins or projections such as 38 and 40, respectively, at radially spaced points along each spoke. The pins or projections 38 and 40 on adjacent spokes are radially offset from each other for agitating the granular material 14 within the housing 12 as will be made clear hereinafter.

The hub 32 is fixed to a shaft 42 which extends through the bottom wall 16 of the housing 12. The shaft 42 is rotatably mounted within a bearing 44. The shaft 42 at its end remote from the hub 32 mounts a sprocket 52. The sprocket 52 is keyed to the shaft 42 as shown at 54. Interposed between the bearing 44 and sprocket 52 is a thrust washer 45.

A drive unit generally designated by the numeral 50 is provided for rotating the hub 32 and its associated spokes and pins or projections. The drive unit 50 includes a variable speed motor 62 having a motor shaft 60. The motor shaft 60 is connected through a slip clutch 64 to a sprocket 58. Entrained between the sprockets 52 and 58 is a variable pitched endless chain 56.

The operation of the hopper 10 is substantially as follows:

The hopper 10 being a self-contained unit, is adapted to be mounted by means of a bracket 18 or the like upon a conventional tablet press or extrusion press. There need be no modification of the press or hopper structure.

Granular material 14, which is to be delivered to a die of a press 30 is deposited within the housing 12. The inclined baffle wall 22 of the baffle 20 directs the granular material 14 to the metering device 24 mounted adjacent the bottom wall 16 of the housing 12. The baffle 20 prevents direct communication between the interior of the housing 12 and the discharge opening 26 and chute 28.

The metering device 24 is then rotated by actuation of the motor 62. The motor 62 drives the chain 56 which in turn drives the shaft 42 and hub 32 of the metering device 24.

Rotation of the hub 32 at a predetermined speed will cause the spokes 34, 36, etc., and pins or projections 38, 40, etc., to sweep a predetermined amount of the granular material 14 per unit of time from adjacent the bottom wall 16 over a predetermined area defined by the discharge opening 26. The amount of material swept into the discharge opening 26 and chute 28 is synchronized with the operation of the tablet forming mechanism and rotation of the die table in the press 30. Hence, a precise amount of material is delivered to the press 30 during each tablet forming sequence.

If more material per unit of time is desired, it is only necessary to increase the speed of the variable speed motor 62. This will increase the amount of material swept by the metering device 24 to the discharge opening 26 and chute 28 per unit of time. In a similar manner, if the rotation of the die table of the press 30 is increased, the hopper 10 is adapted to feed the same amount of material to the press at a different rate, by increasing the speed of the motor 62.

Since the pins or projections 38 and 40 on adjacent spokes 34 and 36 are radially offset from each other, an undulating movement of the granular material 14 in a radial direction adjacent the bottom wall 16 will take place. This insures free flow of the granular material 14 as it will be gently agitated.

The provision of the slip clutch 64 in the drive unit 50 will disengage the metering device 24 from the motor 62 if the granular material becomes jammed in the housing 12 adjacent the discharge opening 26. This will prevent forced movement of the components of the hopper 10 which may result in breakage or injury thereof.

In lieu of the metering device 24, a metering device generally designated by the numeral 66 may be used within the hopper 10 intermediate the baffle 20 and bottom wall 16. The metering device 66 is illustrated in FIGURES 3–5.

The metering device 66 includes a hub 68 for connection to the shaft 42. In lieu of the spokes 34, 36, and pins or projections 38, 40, a foraminous grid of rippled mesh 70 is connected to the hub 68.

The grid 70 can be formed, for example, from aluminum ribbons which are corrugated and connected together so as to form a plurality of diamond-shaped openings 72. The points of connection of adjacent ribbons in the grid 70 are overlapped as shown at 74. The overlapping of adjacent ribbons in the grid 70 produces a plurality of ripples such as 76 in the grid. Hence, instead of being planar, the grid 70 is formed with ripples or undulations. The ripples 76 are projections, which due to the nature of the grid, are radially spaced from the hub 68 and are radially and circumferentially spaced from each other.

When the metering device 66 is placed within the hopper 10, the ripples 76 are adapted to sweep a predetermined amount of the granular material 14 per unit of time to the discharge opening 26 and chute 28. Since the diamond-shaped openings 72 are staggered and offset from each other in adjacent rows, an agitating effect similar to that obtained by the offset radial pins 38 and 40 is also realized.

The present invention may be embodied in other specific forms without departing from the spirit or essential attributes thereof and, accordingly, reference should be made to the appended claims, rather than to the foregoing specification as indicating the scope of the invention.

I claim:
1. A hopper for feeding a metered amount of granular material into a press, said hopper comprising a housing adapted to receive a quantity of granular material, said housing having a bottom wall, a metering device rotatably mounted within said housing adjacent said bottom wall, said metering device including a hub providing an axis of rotation for said metering device, a plurality of upwardly extending projections on said metering device, said projections being in radially spaced relation to said axis of rotation, at least some of the closest adjacent ones of said projections in a generally circumferential direction being offset in a radial direction from each other, chute means communicating with said hopper for receiving a metered amount of granular material and delivering said material to a press, and baffle means within said housing overlying a portion of said metering device for directing granular material to said metering device and preventing direct communication between said chute means and granular material.

2. A hopper in accordance with claim 1 wherein said metering device comprises a plurality of spokes extending radially from said hub, said projections being pins supported by said spokes, the pins on adjacent spokes being offset from each other.

3. A hopper in accordance with claim 1 wherein said metering device comprises a foraminous grid of rippled mesh connected to said hub, said projections being portions of said grid.

4. A metering device for conveying a predetermined amount of granular material per unit time over a predetermined area, said metering device comprising a hub comprising an axis of rotation for said metering device, a plurality of upwardly extending projections on said metering device, said projections being in radially spaced relation to said axis of rotation, at least some of the closest adjacent ones of said projections in a generally circumferential direction being offset in a radial direction from each other.

5. A metering device in accordance with claim 1 comprising a plurality of spokes extending radially from said hub, said projection being pins supported by said spokes, the pins of adjacent spokes being radially offset from each other.

6. A metering device according to claim 1 comprising a foraminous grid of rippled mesh connected to said hub, said projections being portions of said grid.

References Cited by the Examiner
UNITED STATES PATENTS

| 446,118   | 2/1891 | Schofield | 222—370 X |
| 627,983   | 7/1899 | Corser    | 222—370 X |
| 1,673,155 | 6/1928 | Nielsen   | 222—370   |
| 2,399,016 | 4/1946 | Gits      | 222—242 X |
| 2,481,101 | 9/1949 | Francis   | 222—370 X |
| 2,552,413 | 5/1951 | Emerson   | 222—370   |
| 2,872,080 | 2/1959 | Thene     | 222—178   |

FOREIGN PATENTS

| 1,090,992 | 4/1955 | France. |

ROBERT B. REEVES, *Primary Examiner.*

LOUIS J. DEMBO, RAPHAEL M. LUPO, *Examiners.*

H. S. LANE, *Assistant Examiner.*